(12) United States Patent
Hunnekuhl et al.

(10) Patent No.: US 8,672,599 B2
(45) Date of Patent: Mar. 18, 2014

(54) SECURING ELEMENT FOR SECURING AGAINST UNAUTHORIZED UNSCREWING

(75) Inventors: Joerg Hunnekuhl, Jestetten (DE); Juergen Stumpp, Klettgau (DE)

(73) Assignee: Georg Fischer Rohrleitungssysteme AG, Schaffhausen (CH)

(*) Notice: Subject to any disclaimer, the term of this patent is extended or adjusted under 35 U.S.C. 154(b) by 152 days.

(21) Appl. No.: 13/378,012

(22) PCT Filed: Jun. 8, 2010

(86) PCT No.: PCT/EP2010/057954
§ 371 (c)(1),
(2), (4) Date: Dec. 13, 2011

(87) PCT Pub. No.: WO2010/145964
PCT Pub. Date: Dec. 23, 2010

(65) Prior Publication Data
US 2012/0087763 A1 Apr. 12, 2012

(30) Foreign Application Priority Data
Jun. 16, 2009 (EP) .................................... 09162802

(51) Int. Cl.
*F16B 39/02* (2006.01)
(52) U.S. Cl.
USPC ..................................... 411/326; 137/315.05
(58) Field of Classification Search
USPC ........... 411/325, 329, 81, 193, 195, 205, 326, 411/227, 228, 240, 332, 949, 962, 978; 215/245, 289, 293, 337; 137/315.04, 137/315.05
See application file for complete search history.

(56) References Cited

U.S. PATENT DOCUMENTS

| | | | | |
|---|---|---|---|---|
| 1,478,157 | A * | 12/1923 | Wintersteen | 411/329 |
| 1,868,007 | A * | 7/1932 | Frelin | 411/326 |
| 2,177,865 | A * | 10/1939 | Collon | 411/128 |
| 2,443,067 | A * | 6/1948 | Burns | 106/220 |
| 3,208,493 | A * | 9/1965 | Holmes | 411/322 |
| 3,310,191 | A * | 3/1967 | Kern et al. | 215/252 |
| 3,419,057 | A * | 12/1968 | Hogan | 411/125 |
| 4,632,142 | A * | 12/1986 | Shames et al. | 137/437 |
| 4,968,201 | A * | 11/1990 | Frizot | 411/14.5 |
| 5,215,336 | A * | 6/1993 | Worthing | 285/81 |
| 6,173,851 | B1 | 1/2001 | Hague et al. | |
| 7,641,429 | B2 * | 1/2010 | DiStasio et al. | 411/127 |
| 2008/0063489 | A1 * | 3/2008 | Jimenez | 411/149 |

FOREIGN PATENT DOCUMENTS

EP 1959202 A2 8/2008
WO 2008/154575 A1 12/2008

* cited by examiner

*Primary Examiner* — Gary Estremsky
(74) *Attorney, Agent, or Firm* — Bachman & LaPointe, P.C.

(57) ABSTRACT

A securing element (26) for securing against the loosening by rotation of at least two screwable housing parts (3,2), the securing element (26) being arranged so as to be clamped in one of the housing parts (3) and interact with the other housing part (2).

4 Claims, 2 Drawing Sheets

SECURING ELEMENT FOR SECURING AGAINST UNAUTHORIZED UNSCREWING

BACKGROUND OF THE INVENTION

The present invention relates to an element for securing at least two housing parts, which can be screwed together, against unscrewing.

In pipeline construction, various housing parts are screwed together. For example, in the case of a diaphragm valve, the diaphragm is fixed between two housing parts which can be screwed together. It is necessary to be able to open the housing parts in the course of the operating time in order to change the diaphragm. As the clamping of the diaphragm weakens, it is necessary to be able to tighten up the housing parts with respect to each other. During operation of the diaphragm valve, the housing parts should be secured against unscrewing.

On the basis of this prior art, it is an object of the invention to specify an element for securing against unauthorized unscrewing, this element being arranged as integrally as possible in the housing parts and such that it is not visible from outside.

SUMMARY OF THE INVENTION

The object is achieved by an element for securing at least two housing parts, which can be screwed together, against unscrewing, wherein the securing element is arranged in a clamping manner in one of the housing parts such that it engages with the other housing part.

It is advantageous for the diaphragm valve to be secured against unauthorized removal. This is achieved by a securing element being arranged in a clamping manner in the lower housing part. The securing element is arranged between the lower housing part and the external housing of the upper housing part, wherein the securing element has a resilient region having an outwardly facing toothing. The external housing has an inwardly facing further toothing, which engages with the toothing of the securing element, wherein the toothings have two different flank angles, such that the resistance of the housing parts to unscrewing is greater than to tightening.

BRIEF DESCRIPTION OF THE DRAWINGS

An exemplary embodiment of the invention is described with reference to the figures, in which.

DETAILED DESCRIPTION

Figure 1:
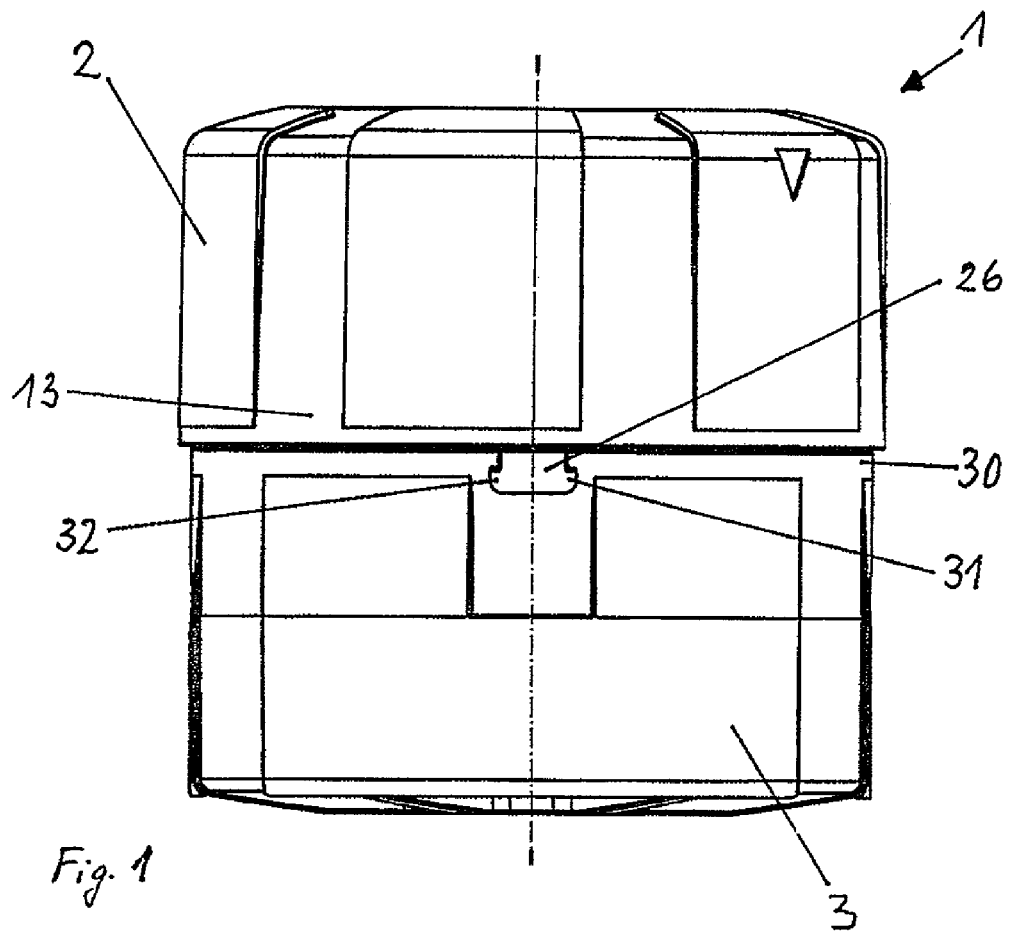
FIG. 1 shows a side view of a valve housing of a diaphragm valve.

FIG. 1 illustrates a side view of an external housing 13 of an upper housing part 2, and a lower housing part 3 of a diaphragm valve 1. A securing element 26 is clamped in the lower housing part 3 with an exact fit and secured against unscrewing. The securing element 26 is arranged in the region of a ledge 30, which acts during screwing-together as an abutment on the lower housing part 3 for the lower edge of the external housing 13. The exact fit and unrotatable arrangement of the securing element 26 are achieved by the formation of two shoulders 31, 32, which fit into a corresponding recess in the lower housing part 3. The securing element 26 can be changed if necessary. In FIG. 1, the diaphragm valve 1 is illustrated in the completely screwed-together state.

Figure 2:
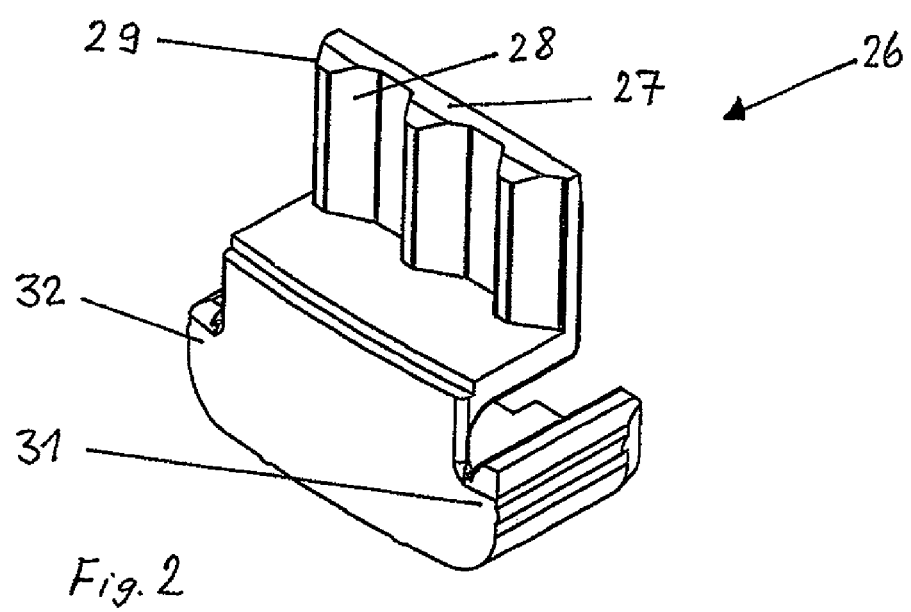
FIG. 2 shows a perspective view of an element for securing the diaphragm valve.

FIG. 2 illustrates the securing element 26 separately in perspective. The securing element 26 has a resilient region 27, which is arranged in parallel with the spindle axis of the diaphragm valve 1 and can spring perpendicularly to the spindle axis. The securing element 26 has outwardly facing tooth flanks 28, 29, which engage with further, inwardly facing tooth flanks (not illustrated here) on the inside of the periphery of an external housing 13 of the upper housing part 2, which are designed to be complementary to one another. The tooth flanks 28, 29 have substantially different flank angles. The result of this is that the force applied for loosening the screwed connection is much greater than the force required for screwing together. The resilient region 27 is arranged inside the external housing 13 and is barely visible, or not visible, from outside the diaphragm valve 1 in the screwed-together state.

Figure 3:
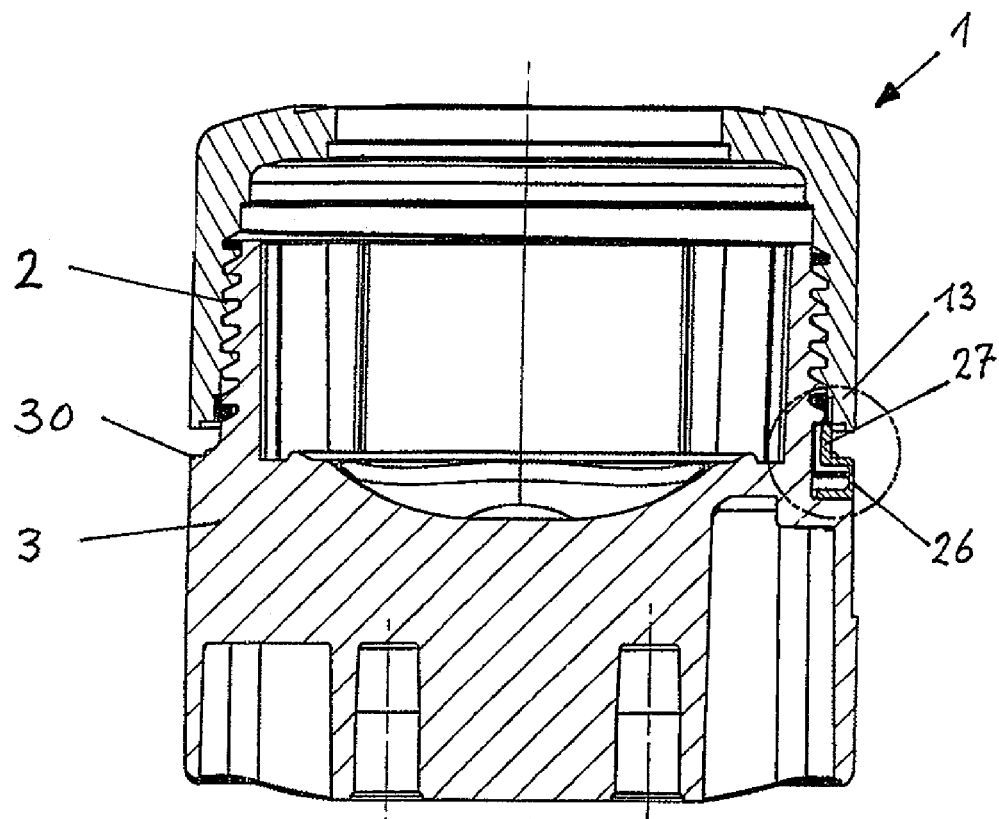
FIG. 3 shows a section through the valve housing with the securing element.

FIG. 3 illustrates a section through the securing element 26 together with the lower housing part 3 and the external housing 13 of the upper housing part 2. FIG. 3 shows the state when the upper housing part 2 and the lower housing part 3 of the diaphragm valve 1 start to be screwed together. The screwing of the upper housing part 2 to the lower housing part 3 can be tightened up with increasing deformation of the diaphragm. The securing element 26 prevents unauthorized opening or unscrewing of the diaphragm valve 1.

Figures 4, 5:
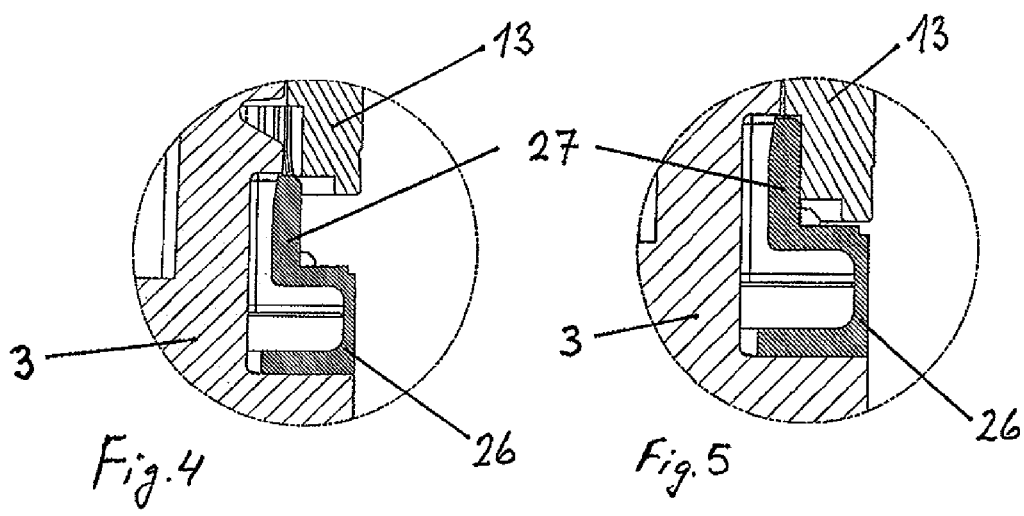
FIG. 4 shows an enlargement of a region of FIG. 3 with the securing element.
FIG. 5 shows an enlargement similar to FIG. 4 with the arrangement in the screwed-together state.

FIGS. 4 and 5 illustrate enlargements of the screwing arrangement. FIG. 4 is an enlargement from FIG. 3 and illustrates the state when screwing together starts and FIG. 5 illustrates the state when screwing together ends.

In order to increase the closing force, a plurality of securing elements 26 can also be arranged distributed around the periphery of the valve housing. The securing element 26 can also be used for valve types other than the diaphragm valve 1 or else for other elements of a pipeline system, for example union nuts, wherein two housing parts are screwed together and must be secured against unauthorized unscrewing.

The invention claimed is:

1. A diaphragm valve comprising an external housing comprising an upper housing part and a lower housing for fixing a diaphragm in the external housing, the upper housing part and lower housing part having thread means for screwing the upper housing part and lower housing part together to form the external housing and a securing element located between the upper housing part and the lower housing part for preventing unauthorized unscrewing of the housing parts, the securing element includes a first part which fits in an unrotatable manner into a recess in one housing part and a second part which is resilient and arranged on an inside surface of the other housing part wherein the second part is substantially not movable from outside the external housing when the housing parts are completely screwed together.

2. A diaphragm valve according to claim 1, wherein the recess is provided with opposing recesses which receive shoulders provided on the first part of the securing element.

3. A diaphragm valve according to claim 1, wherein the second part which is resilient is provided with tooth flanks which engage the inside surface of the other housing part.

4. A diaphragm valve according to claim 3, wherein the tooth flanks on the securing element comprise two different flank angles so that the resistance of the two housing parts for unscrewing is greater than for tightening.

\* \* \* \* \*